(12) United States Patent
Li

(10) Patent No.: US 8,325,161 B2
(45) Date of Patent: Dec. 4, 2012

(54) STYLUS

(75) Inventor: Tao-Liang Li, Shenzhen (CN)

(73) Assignees: Shenzhen Futaihong Precision Industry Co., Ltd., ShenZhen, Guangdong Province (CN); Chi Mei Communication Systems, Inc., Tu-Cheng, New Taipei (TW)

( * ) Notice: Subject to any disclaimer, the term of this patent is extended or adjusted under 35 U.S.C. 154(b) by 707 days.

(21) Appl. No.: 12/493,336

(22) Filed: Jun. 29, 2009

(65) Prior Publication Data
US 2010/0224423 A1  Sep. 9, 2010

(30) Foreign Application Priority Data
Mar. 3, 2009  (CN) .......................... 2009 1 0300658

(51) Int. Cl.
*G06F 3/033* (2006.01)
(52) U.S. Cl. ....................................... 345/179; 345/184

(58) Field of Classification Search .................. 345/156, 345/173–184; 178/18.01–18.07, 19.01–19.07
See application file for complete search history.

(56) References Cited

U.S. PATENT DOCUMENTS

| | | | |
|---|---|---|---|
| 6,876,356 B2 * | 4/2005 | Zloter et al. | 345/179 |
| 7,136,052 B1 * | 11/2006 | Lam | 345/179 |
| 7,374,359 B1 * | 5/2008 | Annerino et al. | 401/258 |
| 2003/0197690 A1 * | 10/2003 | Zimenkov | 345/179 |
| 2005/0162412 A1 * | 7/2005 | Ronkko et al. | 345/179 |
| 2007/0075987 A1 * | 4/2007 | Liu | 345/179 |
| 2008/0291178 A1 * | 11/2008 | Chen et al. | 345/179 |
| 2010/0123688 A1 * | 5/2010 | Lin | 345/179 |

* cited by examiner

*Primary Examiner* — Vijay Shankar
(74) *Attorney, Agent, or Firm* — Altis Law Group, Inc.

(57) ABSTRACT

A stylus includes a main body and a holding member. The holding member connects to the main body. With the holding member being rotatable relative to the main body, a distance between an end of the holding member and the main body is changeable. The stylus is convenient to be used and taken along.

10 Claims, 10 Drawing Sheets

STYLUS

BACKGROUND

1. Technical Field

The present disclosure generally relates to styluses, and particularly, to a stylus applied in a portable electronic device.

2. Description of Related Art

As touch panel technology improves, portable electronic devices without keypads become more popular. A portable electronic device without a keypad generally includes a touch panel and a stylus. Data or commands can be input to the portable electronic device via using the stylus on the touch panel.

A typical stylus of a portable electronic device includes a main body and a nib formed on an end of the main body. Generally, the stylus is received in a storage slot defined in the portable electronic device when not in use, so that it is convenient to carry the stylus. When using the stylus, the stylus is held by grasping the main body. As portable electronic deceives becoming lighter and smaller, then receiving slots styluses also become smaller.

However, a stylus that is too small may be uncomfortable for users to wield.

Therefore, there is room for improvement within the art.

BRIEF DESCRIPTION OF THE DRAWINGS

Many aspects of the exemplary embodiments can be better understood with references to the following drawings. The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
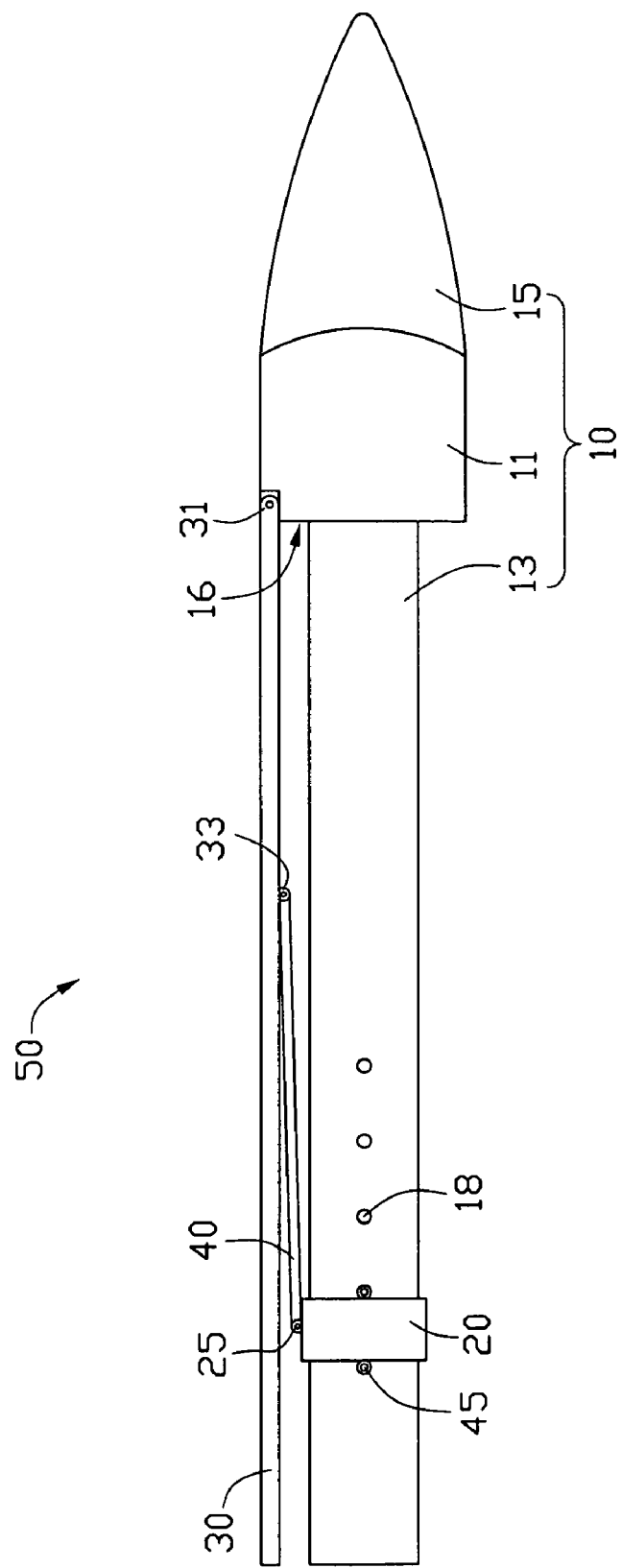
FIG. 1 is a schematic view of a first exemplary embodiment of a stylus.

Referring to FIG. 1, a first exemplary embodiment of a stylus 50 applied in a portable electronic device (not shown), includes a main body 10, a sliding member 20, a holding member 30, a supporting member 40, and two positioning members 45. The sliding member 20 is slidably sleeved on the main body 10. The holding member 30 is rotatably connected to the main body 10. Two ends of the supporting member 40 are hinged to the sliding member 20 and the holding member 30 correspondingly.

The main body 10 includes a connecting portion 11, a shaft portion 13, and a nib 15. The connecting portion 11 is between the shaft portion 13 and the nib 15. A radius of the connecting portion 11 is larger than a radius of the shaft portion 13. A stepped surface 16 is formed on the main body 10 between the connecting portion 11 and the shaft portion 13. A plurality of latching holes 18 are defined in a straight line in the shaft portion 13 parallel to the axis of the shaft portion 13. In the illustrated exemplary embodiment, the main body 10 is cylindrical.

The sliding member 20 includes a through hole (not shown) running through two opposite ends of the sliding member 20. A projection 25 is extended from an outer surface of the sliding member 20 and used to hinge the sliding member 20 to one end of the supporting member 40. In the illustrated exemplary embodiment, the sliding member 20 is a hollow cylinder.

The holding member 30 includes a first hinging portion 31 and a second hinging portion 33. The first hinging portion 31 is formed on an end of the holding member 30. The holding member 30 can rotate relative to the main body 10 by the first hinging portion 31 rotatably connecting the holding member 30 to an end of the connecting portion 11 adjacent to the stepped surface 16. The second hinging portion 33 is extended from the middle of the holding member 30 and used to hinge the holding member 30 to the other end of the supporting member 40. In the illustrated exemplary embodiment, the holding member 30 is cylindrical for comfortable grasping by a user.

When assembling the stylus 50, the holding member 30 is rotatably connected to the main body 10 by the first hinging portion 31 engaging with the connecting portion 11. The sliding member 20 is slidably sleeved on the shaft portion 13 of the main body 10. Two ends of the supporting member 40 hinge the supporting member 40 to the second hinging portion 33 of the holding member 30 and the projection 25 of the sliding member 20 correspondingly. The positioning members 45 are latched in two adjacent latching holes 18 correspondingly, to position the sliding member 20 on the main body 10. As such, the stylus 50 is assembled.

Figure 2:
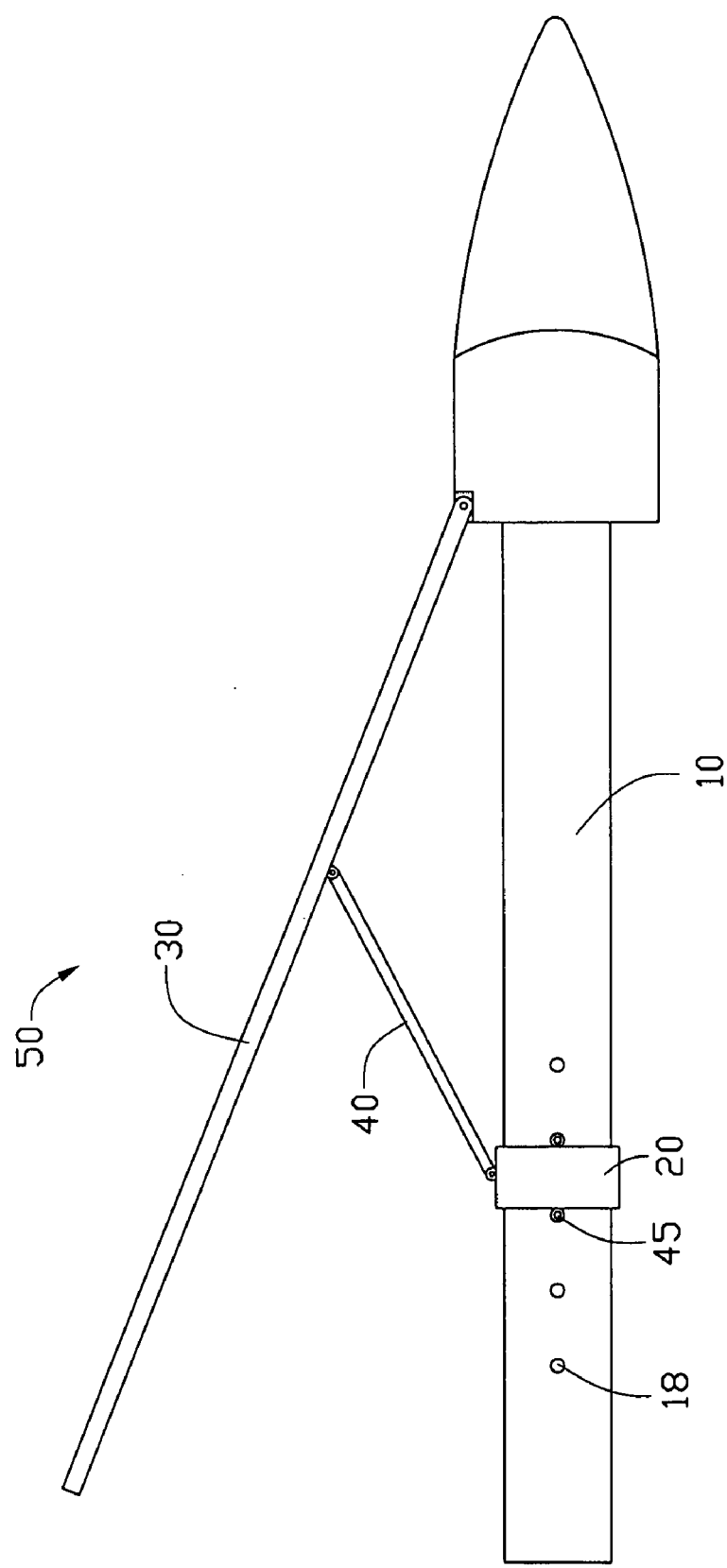
FIG. 2 is a schematic view of the stylus in FIG. 1, showing a state in which the stylus is used.

Referring to FIG. 1, when the stylus 50 is received in the portable electronic device, the holding member 30 is folded to the main body 10. Referring also to FIG. 2, in use, the positioning members 45 are taken out from the latching holes 18. The holding member 30 rotates relative to the main body 10 around the first hinging portion 31 by sliding the sliding member 20 along the main body 10 and the positioning members 45 are positioned in another two adjacent latching holes 18. As such, other portions of the holding member 30 excepting the first hinging portion 31 rotate away from the shaft portion 13, therefore a user can comfortably hold the stylus 50. When a user wants to fold the holding member 30 to the main body 10, the sliding member 20 should be slid back along the main body 10. When the holding member 30 is folded to the main body 10, the stylus 50 becomes smaller requiring little space for storage in the electronic device.

The stylus 50 is convenient to be held when the holding member 30 is unfolded from the main body 10. The stylus 50 is convenient to be taken along when the holding member 30 is folded to the main body 10.

It can be understood that, the stylus 50 may include two or more holding members 30 and one or more than two positioning members 45. The radius of the connecting portion 11 may be equal to the radius of the shaft portion 13. When the stylus 50 includes one positioning member 45, the positioning member 45 is latched in one of the latching holes 18 to prevent the sliding member 20 from sliding and to hold the sliding member 20 in position.

Figure 3:
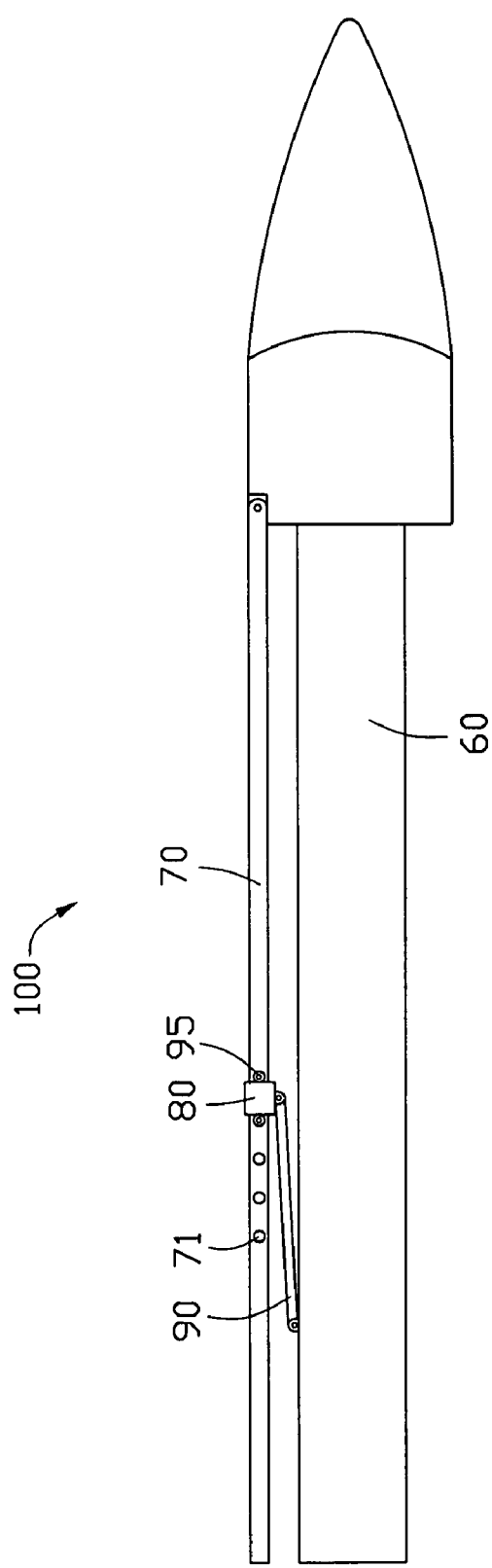
FIG. 3 is a schematic view of a second exemplary embodiment of a stylus.
Figure 4:
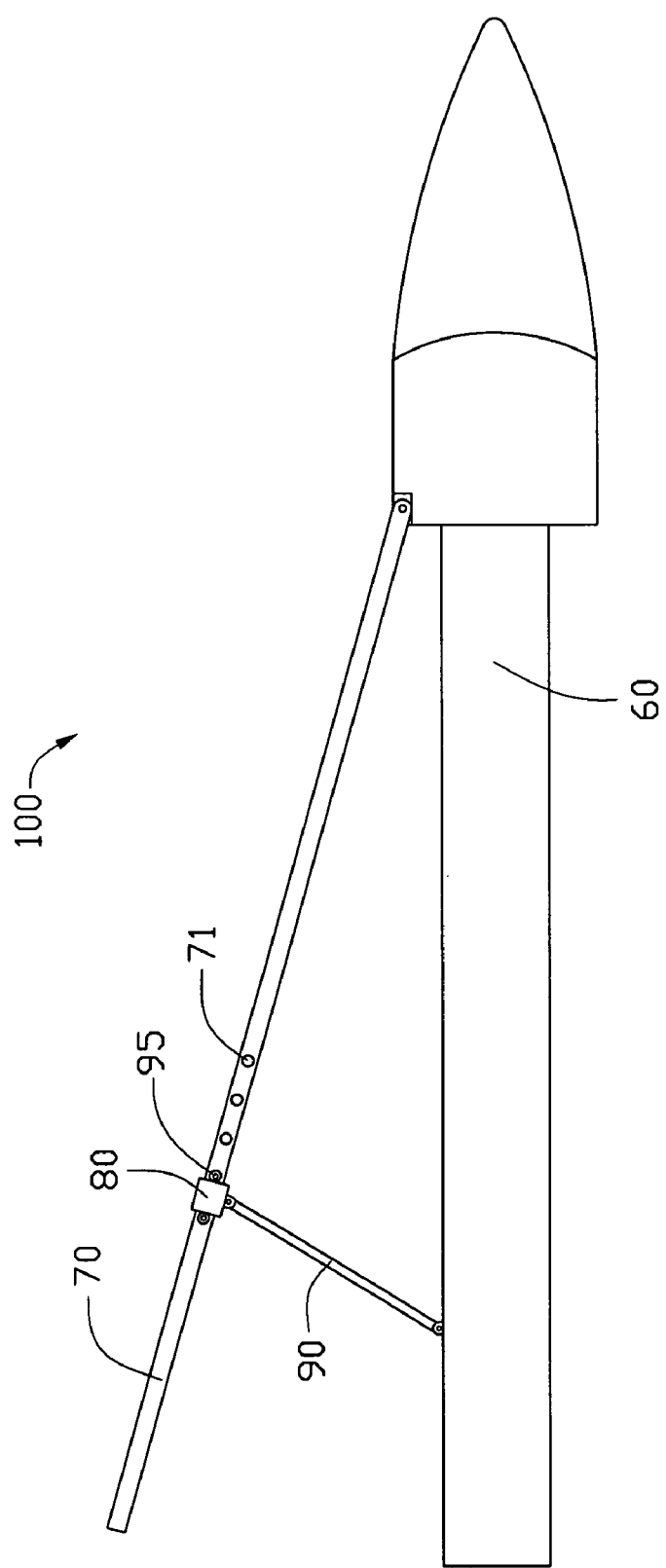
FIG. 4 is a schematic view of the stylus in FIG. 3, showing a state in which the stylus is used.

Referring to FIG. 3 and FIG. 4, a second exemplary embodiment of a stylus 100 is similar to the stylus 50 of the first exemplary embodiment, except that a sliding member 80 is slidably sleeved on a holding member 70. Two ends of a supporting member 90 hinge the supporting member 90 to a main body 60 and the sliding member 80 correspondingly. Latching holes 71 used to receive positioning members 95 are defined in the holding member 70 to position the sliding member 80 on the holding member 70. The stylus 100 is convenient to be held when the holding member 70 is unfolded from the main body 60. The stylus 100 is convenient to be taken along when the holding member 70 is folded to the main body 60.

Figure 5:
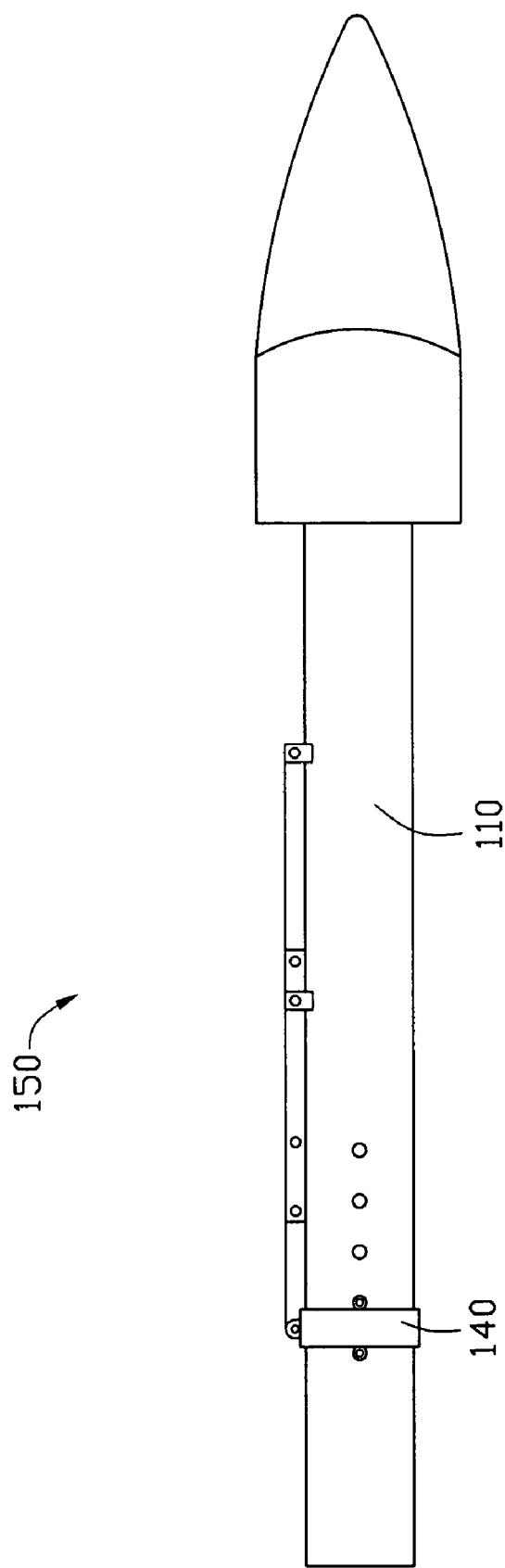
FIG. 5 is a schematic view of a third exemplary embodiment of a stylus.
Figure 6:
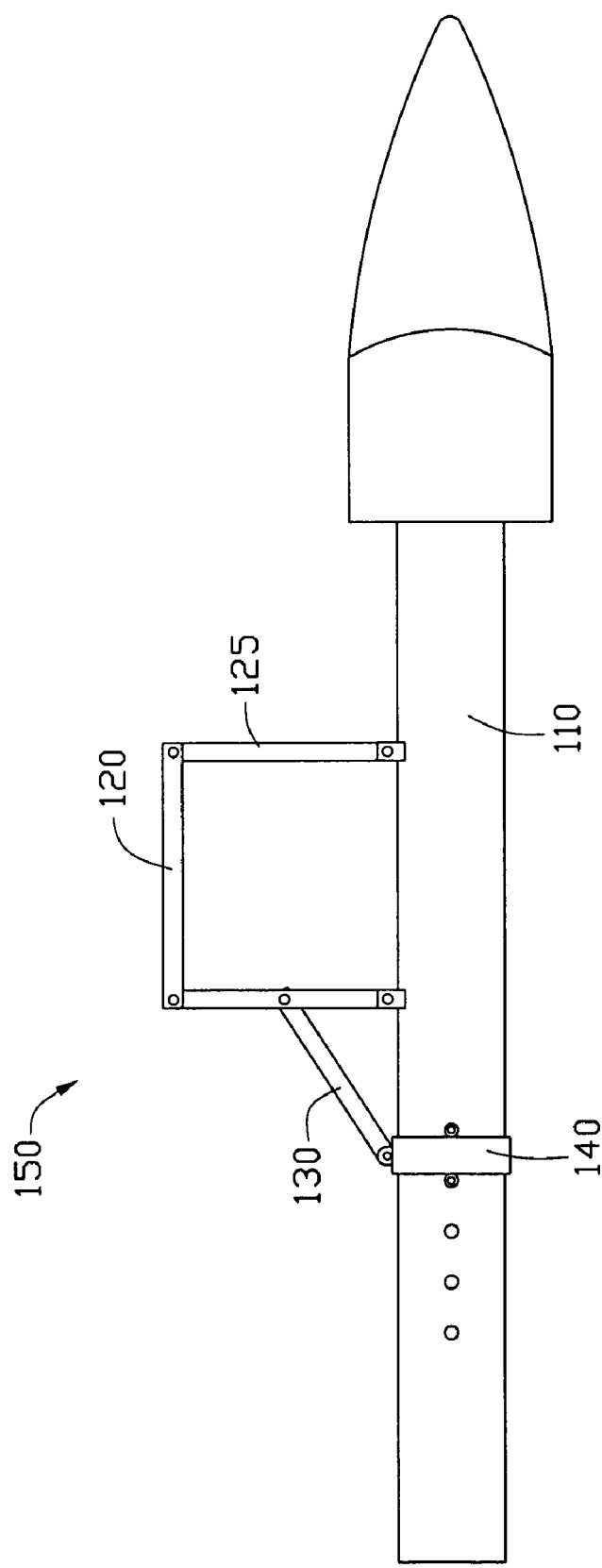
FIG. 6 is a schematic view of the stylus in FIG. 5, showing a state in which the stylus is used.

Referring to FIG. 5 and FIG. 6, a third exemplary embodiment of a stylus 150 is similar to the stylus 50 in the first exemplary embodiment, except that the stylus 150 further includes two connecting members 125 positioned opposite to each other. Two ends of each connecting member 125 hinge the connecting member 125 to a main body 110 and a holding member 120 correspondingly. Two ends of a supporting member 130 hinge the supporting member 130 to a sliding member 140 and one of the connecting members 125 correspondingly. In use, the stylus 150 is convenient to be held when the holding member 120 is unfolded from the main body 110. The stylus 150 is convenient to be taken along when the holding member 120 is folded to the main body 110.

Figure 7:
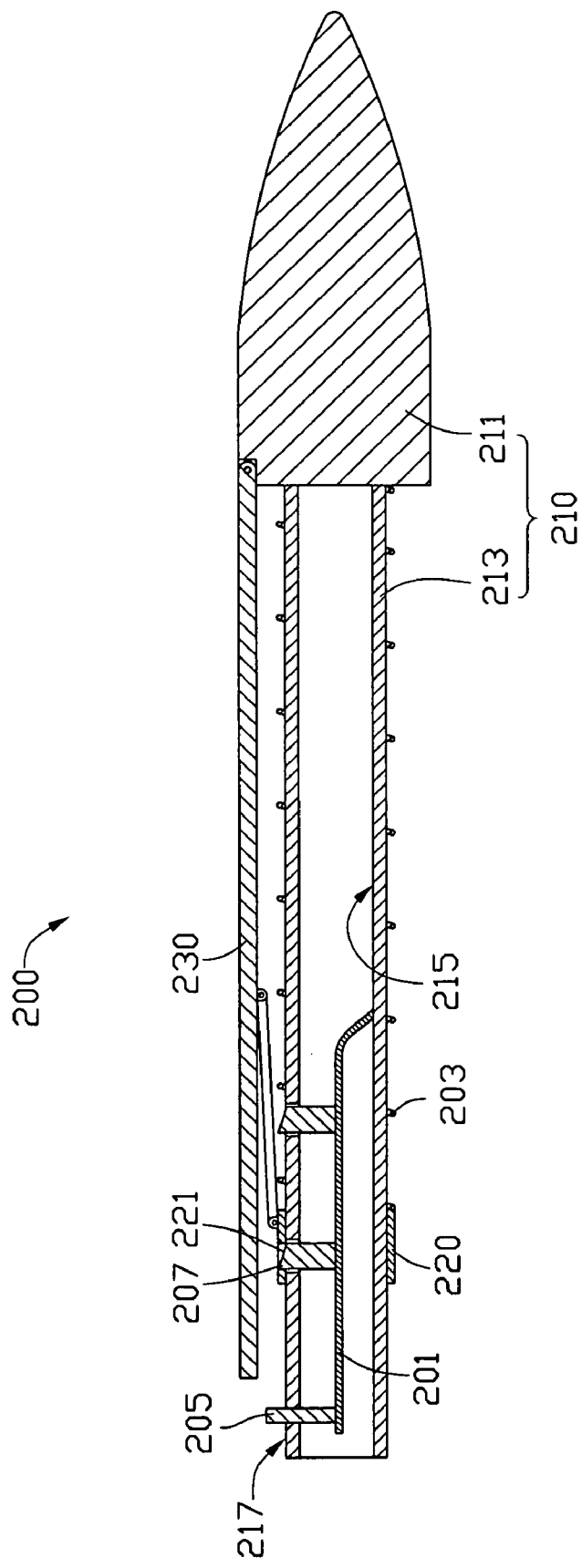
FIG. 7 is a schematic view of a fourth exemplary embodiment of a stylus.
Figure 8:
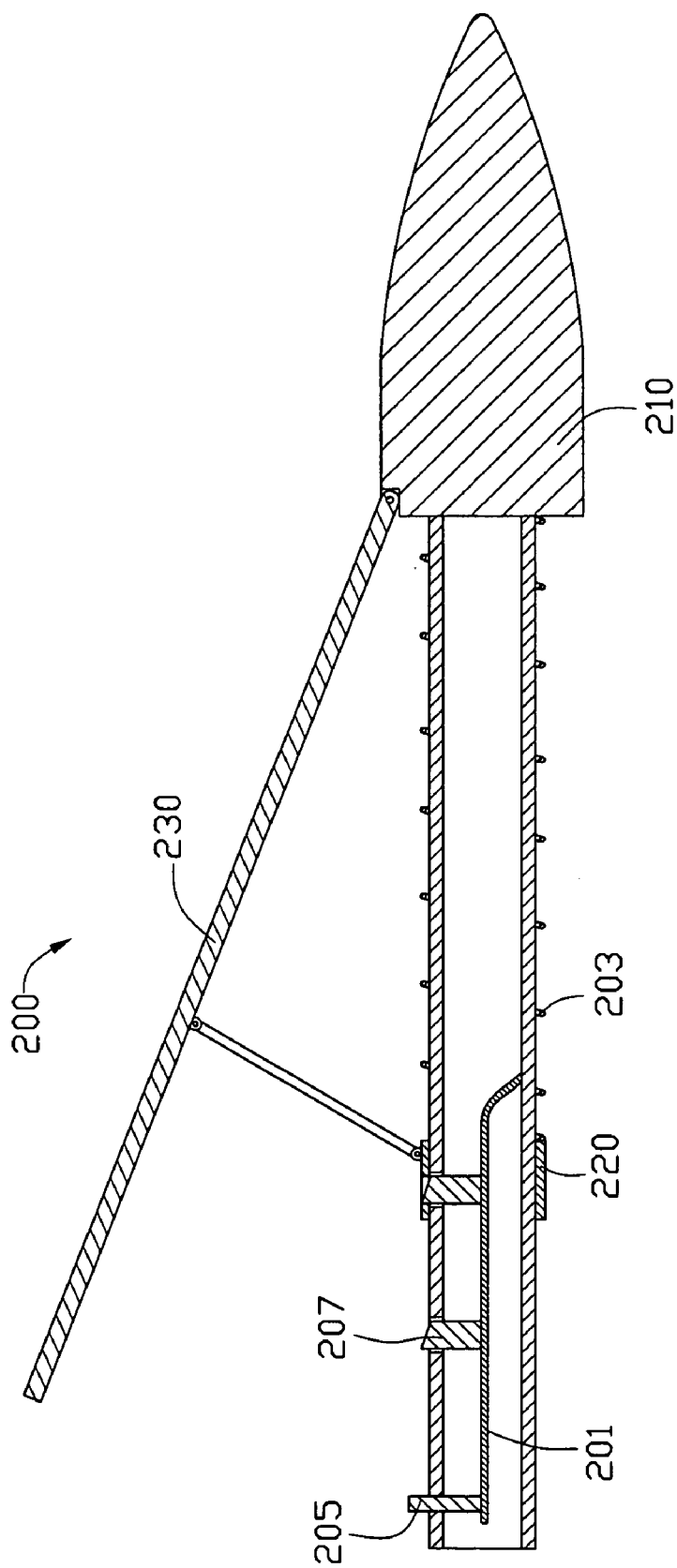
FIG. 8 is a schematic view of the stylus in FIG. 7, showing a state in which the stylus is used.

Referring to FIG. 7 and FIG. 8, a fourth exemplary embodiment of a stylus 200 is similar to the stylus 50 in the first exemplary embodiment, except that the stylus 200 further includes a first elastic member 201, a second elastic member 203, and a button 205. A shaft portion 213 of a main body 210 is hollow, including an inner wall 215. An end of the first elastic member 201 is fixed to the inner wall 215. A plurality of elastic latching portions 207 are formed on the first elastic member 201. The elastic latching portions 207 protrude beyond an outer surface 217 of the shaft portion 213. The second elastic member 203 is a spring sleeved on the shaft portion 213. Two ends of the second elastic member 203 are connected to a connecting portion 211 and a sliding member 220 correspondingly. The sliding member 220 defines a latching slot 221. A holding member 230 is capable of being positioned at different positions with the latching slot 221 receiving different elastic latching portions 207. One end of the button 205 is connected to a free end of the first elastic member 20, and the other end of the button 205 protrudes beyond the outer surface 217 of the shaft portion 213 for facilitating convenient operation of the button 205.

Referring to FIG. 7, when the stylus 200 is received in a portable electronic device, one of the elastic latching portions 207 is latched in the latching slot 221 of the sliding member 220, and the second elastic member 203 is at a stretched state.

Referring to FIG. 8, in use, the button 205 is operated to force the first elastic member 201 bending downward. The elastic latching portion 207 latched in the latching slot 221 emerges out of the latching slot 221. The sliding member 220 slides along the connecting portion 211 with the rebounding of the second elastic member 203. When the sliding member 220 slides along the connecting portion 211, another one of the elastic latching portions 207 is latched in the latching slot 221 to position the sliding member 220 at a new position on the main body 210, so that, a user can hold the stylus 200 conveniently and comfortably. The stylus 200 is convenient to be taken along when the holding member 230 is folded to the main body 210.

Figure 9:
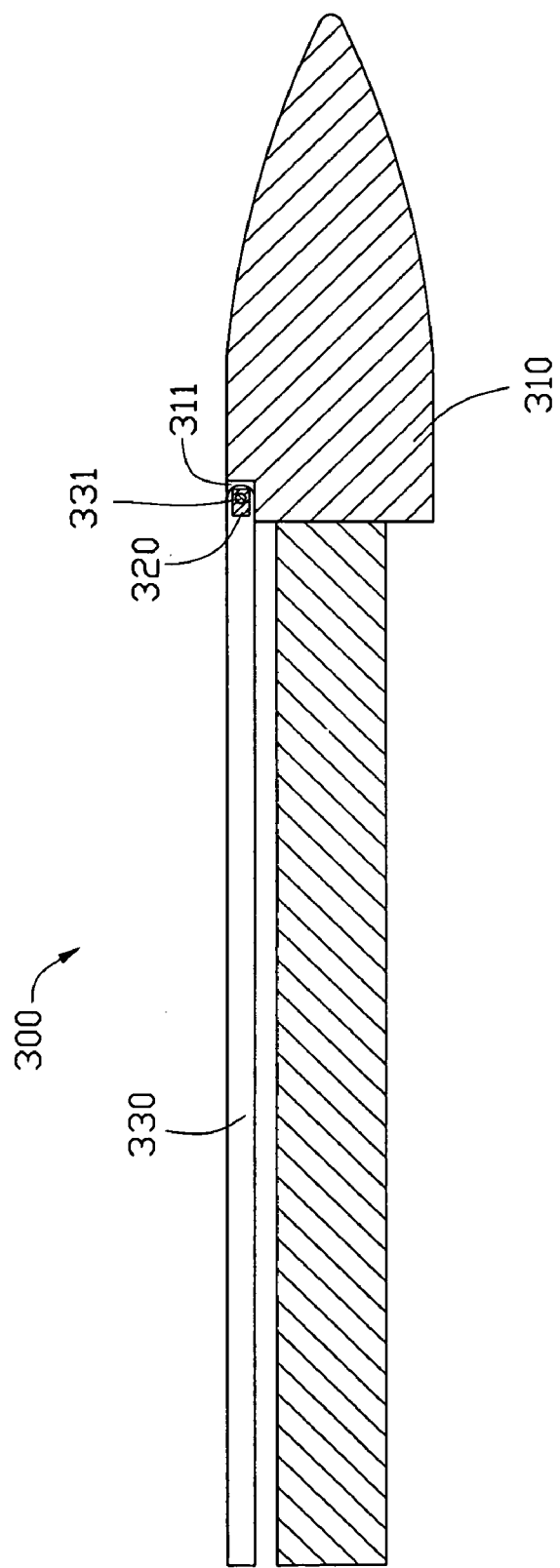
FIG. 9 is a schematic view of a fifth exemplary embodiment of a stylus.
Figure 10:
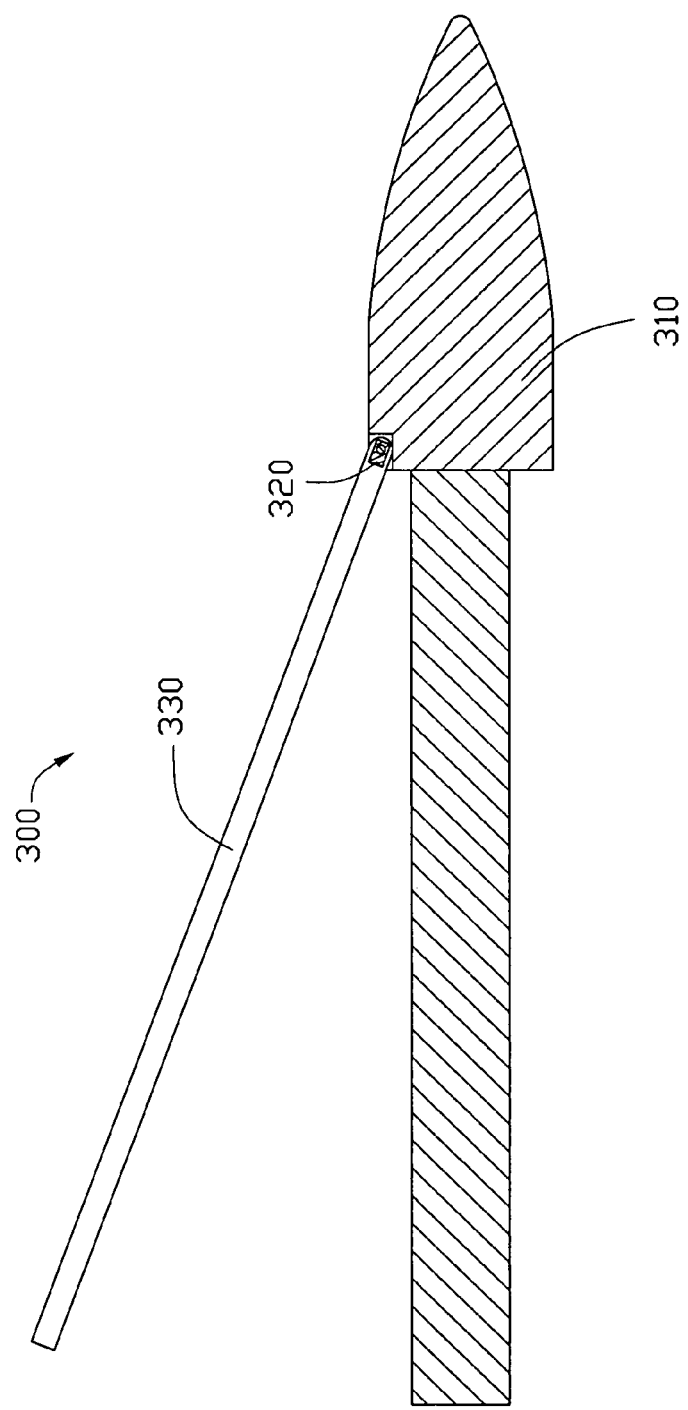
FIG. 10 is a schematic view of the stylus in FIG. 9, showing a state in which the stylus is used.

Referring to FIG. 9 and FIG. 10, a fifth exemplary embodiment of a stylus 300 includes a main body 310, a friction wafer 320, and a holding member 330. The holding member 330 is rotatably connected to the main body 310 by a connecting portion 331 formed on the holding member 330 engaging with an engaging portion 311 formed on the main body 310. The friction wafer 320 is positioned between the engaging portion 311 and the holding member 330. With the friction generated between the friction wafer 320 and the holding member 330, and between the friction wafer 320 and the main body 310, the holding member 330 can be positioned at different positions, thus, the stylus 300 is convenient to be held when the holding member 330 is unfolded from the main body 310. The stylus 300 is convenient to be taken along when the holding member 330 is folded to the main body 310.

Finally, while various exemplary embodiments have been described and illustrated, the disclosure is not to be construed as being limited thereto. Various modifications can be made to the exemplary embodiments by those skilled in the art without departing from the true spirit and scope of the disclosure as defined by the appended claims.

What is claimed is:

1. A stylus, comprising: a main body; and a holding member, the holding member comprising a first hinging portion rotatably connected to the main body, a distance between an end of the holding member opposite to the first hinging portion and the main body is changeable, and an angle is formed between the holding member and the main body to unfold the stylus by moving the holding member relative to the main body; a sliding member, a supporting member, and a positioning member, the sliding member is slidably sleeved on the holding member, the ends of the supporting member correspondingly hinge to the main body and the sliding member, a plurality of latching holes is defined in the holding member, the sliding member is positioned on the holding member with the positioning member engaging in a latching hole.

2. The stylus of claim 1 further comprising a sliding member and a supporting member, the holding member further comprises a second hinging portion, the sliding member slidably sleeved on the main body, the ends of the supporting member correspondingly hinged to the second hinging portion and the sliding member.

3. The stylus of claim 2 further comprising a positioning member, the main body defines a plurality of latching holes, the holding member and the sliding member is positioned on the main body with the positioning member engaging a latching hole.

4. The stylus of claim 2, wherein the main body is hollow, the sliding member defines a latching slot, the stylus further comprises a first elastic member positioned on an inner wall of the main body, forms at least two elastic latching portion protruding beyond an outer surface of the main body, the latching slot is capable of receiving different elastic latching portion when the sliding member slides at different positions.

5. The stylus of claim 4 further comprising a button, the first elastic member includes a free end, one end of the button is connected to the free end, the other end of the button protrudes beyond the outer surface of the main body.

6. The stylus of claim 5 further comprising a second elastic member, two ends of the second elastic member are connected to the main body and the sliding member correspondingly, the sliding member slides on the main body with the rebounding of the second elastic member.

7. The stylus of claim 1 further comprising a sliding member, a supporting member, and two connecting member, the sliding member is slidably sleeved on the main body, the ends of each connecting member correspondingly hinge to the main body and the holding member, the end of the supporting member correspondingly hinge to the sliding member and one of the connecting members.

8. The stylus of claim 1, wherein the holding member rotatably connected to the main body, and the holding member may be positioned at different positions by a friction force generated between the holding member and the main body.

9. A stylus, comprising: a main body; a holding member, the holding member comprising a first hinging portion rotatably a connected to the main body, a distance between an end of the holding member and the main body being changeable by rotating the holding member relative to the main body;
- a sliding member slidably sleeved on the holding member;
- a supporting member, two ends of the supporting member correspondingly hinge to the main body and the sliding member; and
- a positioning member, the positioning member defining a plurality of latching holes, the sliding member positioned on the holding member with the positioning member engaging in a latching hole.

10. A stylus, comprising:
a main body;
a holding member, the holding member comprising a first hinging portion rotatably a connected to the main body, a distance between an end of the holding member and the main body being changeable by rotating the holding member relative to the main body;
a sliding member, the sliding member slidably sleeved on one of the main body and the holding member and capable of positioning on one of the main body and the holding member; and
a supporting member, one end of the supporting member directly hinged to one of the main body and the holding member, an another end of the supporting member hinged to other one of the main body and the holding member by the sliding member.

* * * * *